(12) United States Patent
Grinnell et al.

(10) Patent No.: US 12,024,372 B2
(45) Date of Patent: Jul. 2, 2024

(54) SYSTEM AND METHOD FOR HANDLING AND EVALUATING PRODUCTS PACKAGED IN FLEXIBLE BAGS

(71) Applicant: Quest Industrial LLC, Monroe, WI (US)

(72) Inventors: Erik Grinnell, Monroe, WI (US); Garret Crandall, Monroe, WI (US); Richard Mullenhour, Monroe, WI (US)

(73) Assignee: QUEST INDUSTRIAL LLC, Monroe, WI (US)

( * ) Notice: Subject to any disclaimer, the term of this patent is extended or adjusted under 35 U.S.C. 154(b) by 118 days.

(21) Appl. No.: 17/946,564

(22) Filed: Sep. 16, 2022

(65) Prior Publication Data

US 2023/0085671 A1 Mar. 23, 2023

Related U.S. Application Data

(60) Provisional application No. 63/246,078, filed on Sep. 20, 2021.

(51) Int. Cl.
*B65G 43/08* (2006.01)
*B65G 35/08* (2006.01)
(Continued)

(52) U.S. Cl.
CPC ............. *B65G 43/08* (2013.01); *B65G 35/08* (2013.01); *B65G 47/38* (2013.01); *G01L 5/0038* (2013.01); *B65G 2203/0208* (2013.01)

(58) Field of Classification Search
CPC ........ B65G 43/08; B65G 35/08; B65G 47/38; B65G 2203/0208; B65G 47/841;
(Continued)

(56) References Cited

U.S. PATENT DOCUMENTS 4,167,996 A * 9/1979 Cutter .................. B65G 17/323
198/803.3
4,623,201 A 11/1986 Gallone
(Continued)

FOREIGN PATENT DOCUMENTS

DE 102015224874 A1 * 6/2017
DE 102018215854 A1 * 3/2020 ............. B65B 35/36
(Continued)

*Primary Examiner* — Gene O Crawford
*Assistant Examiner* — Muhammad Awais
(74) *Attorney, Agent, or Firm* — THOMPSON HINE LLP (57) ABSTRACT

A system for transporting and evaluating flexible bags filled with product includes a running rail and a plurality of conveying elements mounted for movement along the running rail. A control system is configured such that each conveying element is independently movable along running rail, wherein the control system is further configured such that a first conveying element of the plurality of conveying elements and a second conveying element of the plurality of conveying elements are controlled such that a flexible bag is squeezed between the first conveying element and the second conveying element, and the control system is further configured to evaluate a squeeze force on the flexible bag and/or a dimensional spacing between the first conveying element and the second conveying element in order to identify the flexible bag as having a satisfactory seal or an unsatisfactory seal.

20 Claims, 6 Drawing Sheets

(51) Int. Cl.
*B65G 47/38* (2006.01)
*G01L 5/00* (2006.01)

(58) Field of Classification Search
CPC ...... B65G 54/02; B65G 17/32; B65G 17/323;
G01L 5/0038; G01M 3/3218
USPC .................................................. 198/341.08
See application file for complete search history.

(56) References Cited

U.S. PATENT DOCUMENTS

| | | | |
|---|---|---|---|
| 4,867,579 A | 9/1989 | Gallone | |
| 4,884,898 A | 12/1989 | Magnuson | |
| 5,018,928 A * | 5/1991 | Hartlepp | B65G 47/962 |
| | | | 414/337 |
| 5,211,279 A | 5/1993 | Abbestam | |
| 5,915,840 A | 6/1999 | Daubert et al. | |
| 6,766,897 B2 | 7/2004 | Kuwabara | |
| 8,132,330 B2 | 3/2012 | Schroeder | |
| 9,499,357 B2 * | 11/2016 | Aumann | B65G 54/02 |
| 10,858,192 B2 * | 12/2020 | Neufeld | B65G 35/06 |
| 10,967,892 B2 * | 4/2021 | Cooper | G05D 1/0291 |
| 11,097,908 B2 * | 8/2021 | Tanaka | B65G 43/10 |
| 2009/0095192 A1 | 4/2009 | Roop | |
| 2014/0291124 A1 | 10/2014 | Fenile | |
| 2015/0027338 A1 | 1/2015 | Aumann | |
| 2015/0321857 A1 * | 11/2015 | Sacchetti | B65G 47/845 |
| | | | 198/419.2 |
| 2016/0031648 A1 * | 2/2016 | Prüssmeier | B65G 9/002 |
| | | | 104/107 |
| 2016/0046444 A1 * | 2/2016 | Fenile | B65G 39/18 |
| | | | 104/93 |
| 2016/0176659 A1 * | 6/2016 | Aumann | B65G 54/02 |
| | | | 198/619 |
| 2016/0229645 A1 * | 8/2016 | Von Ehrenstein | B65G 54/02 |
| 2017/0081052 A1 * | 3/2017 | Aichinger | B65G 43/08 |
| 2019/0233152 A1 * | 8/2019 | Nakamoto | B65B 51/32 |
| 2019/0291968 A1 * | 9/2019 | Gallati | B65G 19/025 |
| 2020/0003257 A1 * | 1/2020 | Neufeld | B65G 54/02 |
| 2020/0130952 A1 | 4/2020 | Eisenberg | B65B 43/465 |
| 2020/0207496 A1 * | 7/2020 | Schwab | B29C 51/268 |
| 2021/0047133 A1 * | 2/2021 | Hoag | B65G 47/38 |
| 2021/0245960 A1 * | 8/2021 | Kiessner | B65G 54/02 |

FOREIGN PATENT DOCUMENTS

| | | | | |
|---|---|---|---|---|
| EP | | 2301867 A2 * | 3/2011 | ............ B65G 35/08 |
| WO | WO-2014108287 A1 * | | 7/2014 | ............ B65G 47/082 |
| WO | WO-2019129394 A1 * | | 7/2019 | ............ B65B 31/02 |
| WO | WO-2020089177 A1 * | | 5/2020 | ............ B07C 5/10 |

* cited by examiner

SYSTEM AND METHOD FOR HANDLING AND EVALUATING PRODUCTS PACKAGED IN FLEXIBLE BAGS

TECHNICAL FIELD

This application relates generally to handling of products packaged in flexible bags and, more specifically, to a system for handling and evaluating flexible bags holding food products, such as snack foods.

BACKGROUND

Existing systems utilize a conveyor system to transfer bags horizontally into a machine that uses a roller to exert pressure on the bag, determining seal integrity. The machine can only be supplied with bags in the horizontal orientation (i.e., bags lying "flat" and oriented with top sealed edge and bottom seal edge at substantially the same height). This also requires that the bags are spaced along the conveyor system with gaps between the bags, thus requiring an undesirably large overall footprint and eliminating possibilities for accumulation within the machines. Use of a roller is also undesirably imprecise and creates a potential for damaging product within the bags.

It would be desirable to provide an improved system for handling and evaluating flexible bags.

SUMMARY

In one aspect, a system and method are provided for accurately determining bag seal integrity while maintaining a positive position on the bags in a vertical orientation.

In another aspect, a system and method are provided for evaluating bag seal integrity while at the same time decoupling loading and unloading of the machine so as to provide dynamic accumulation.

In another aspect, a linear transport and accumulation system is configured for measuring bag dimensional width (aka thickness) and comparing against a defined dimensional range with integrated force-feedback which is also evaluated and compared to a known force range. This combination of the force values and dimensional values are used to perform quality check of flexible bag seal integrity.

In a further aspect, a system for transporting and evaluating flexible bags filled with product, includes a running rail and a plurality of conveying elements mounted for movement along the running rail. A control system is configured such that each conveying element is independently movable along running rail, wherein the control system is further configured such that a first conveying element of the plurality of conveying elements and a second conveying element of the plurality of conveying elements are positioned to form a bag receiving space therebetween and int which a flexible bag can be loaded, wherein the control system is further configured to control movement of the first conveying element and the second conveying element such that the flexible bag is squeezed between the first conveying element and the second conveying element during movement of at least one of the first conveying element and the second conveying element for transport, wherein the control system is further configured to evaluate a squeeze force on the flexible bag between the first conveying element and the second conveying element and/or a dimensional spacing between the first conveying element and the second conveying element in order to identify the flexible bag as having a satisfactory seal or an unsatisfactory seal.

In one implementation of the foregoing aspect, the flexible bag is oriented vertically in the bag receiving space during transport and evaluation.

In one implementation of the foregoing aspect, the control system is configured to determine if the squeeze force meets or exceeds a threshold squeeze force while the first conveying element and the second conveying element satisfy the predefined dimensional spacing condition.

The control system may also be configured such that, if the squeeze force meets or exceeds the threshold squeeze force, the control system identifies the flexible bag as having a satisfactory seal. However, re-checks could occur thereafter (e.g., at various positions of bag transport) in attempt to identify small leaks, the impact of which may not be detectable during the initial check.

The control system may also be configured such that, if the control system identifies the flexible bag as having a satisfactory seal, the control system effects movement of the first conveying element and the second conveying element to position the flexible bag at an unload area of the running rail.

The control system may also be configured to effect movement of the first conveying element and the second conveying element to position the flexible bag at an accumulation region of the running rail prior to positioning of the flexible bag at the unload area.

The control system may also be configured such that, if the squeeze force does not meet or exceed the threshold squeeze force while the first conveying element and the second conveying element satisfy the predefined dimensional spacing condition, the control system identifies the flexible bag a having an unsatisfactory seal. The control system may also be configured to identify a flexible bag that is out of bounds of an acceptable thickness range (e.g., overfilled or underfilled).

The control system may also be configured such that, if the control system identifies the flexible bag as having an unsatisfactory seal, the control system effects movement of the first conveying element and the second conveying element such that the flexible bag is dropped out of the bag receiving space in a reject operation.

The running rail may be formed as a continuous rail loop.

In another aspect, a method for handling and evaluating a flexible bag filled with product utilizing a system having a running rail and first and second conveying elements mounted for controllable independent movement along the running rail, the method comprising: positioning the first conveying element and the second conveying element at a spaced apart locations at which a bag receiving space is formed therebetween; loading a flexible bag into the bag receiving space; and controlling movement of at least one of the first conveying element and the second conveying element such that the flexible bag is squeezed between the first conveying element and the second conveying element in order to evaluate seal integrity of the flexible bag.

In implementations of the method, a squeeze force on the flexible bag is evaluated in order to evaluate seal integrity.

In implementations of the method, the squeeze force is evaluated, at least in part, while the first conveying element and the second conveying element are substantially stationary.

In implementations of the method, the squeeze force is evaluated, at least in part, while the first conveying element and the second conveying element are simultaneously moving to transport the flexible bag.

In implementations of the method, a spacing condition between the first conveying element and the second conveying element is also evaluated, along with the squeeze force, to evaluate seal integrity.

In in implementations of the method, evaluation of the spacing condition involves determining whether a distance between the first and second conveying elements is within a set range.

In implementations of the method, at least one motor current is evaluated as an indicator of the squeeze force.

In implementations of the method, a further step involves evaluating a spacing achieved between the first conveying element and the second conveying element in order to evaluate a fill level of the flexible bag.

The details of one or more embodiments are set forth in the accompanying drawings and the description below. Other features, objects, and advantages will be apparent from the description and drawings, and from the claims.

DETAILED DESCRIPTION

Figure 1:
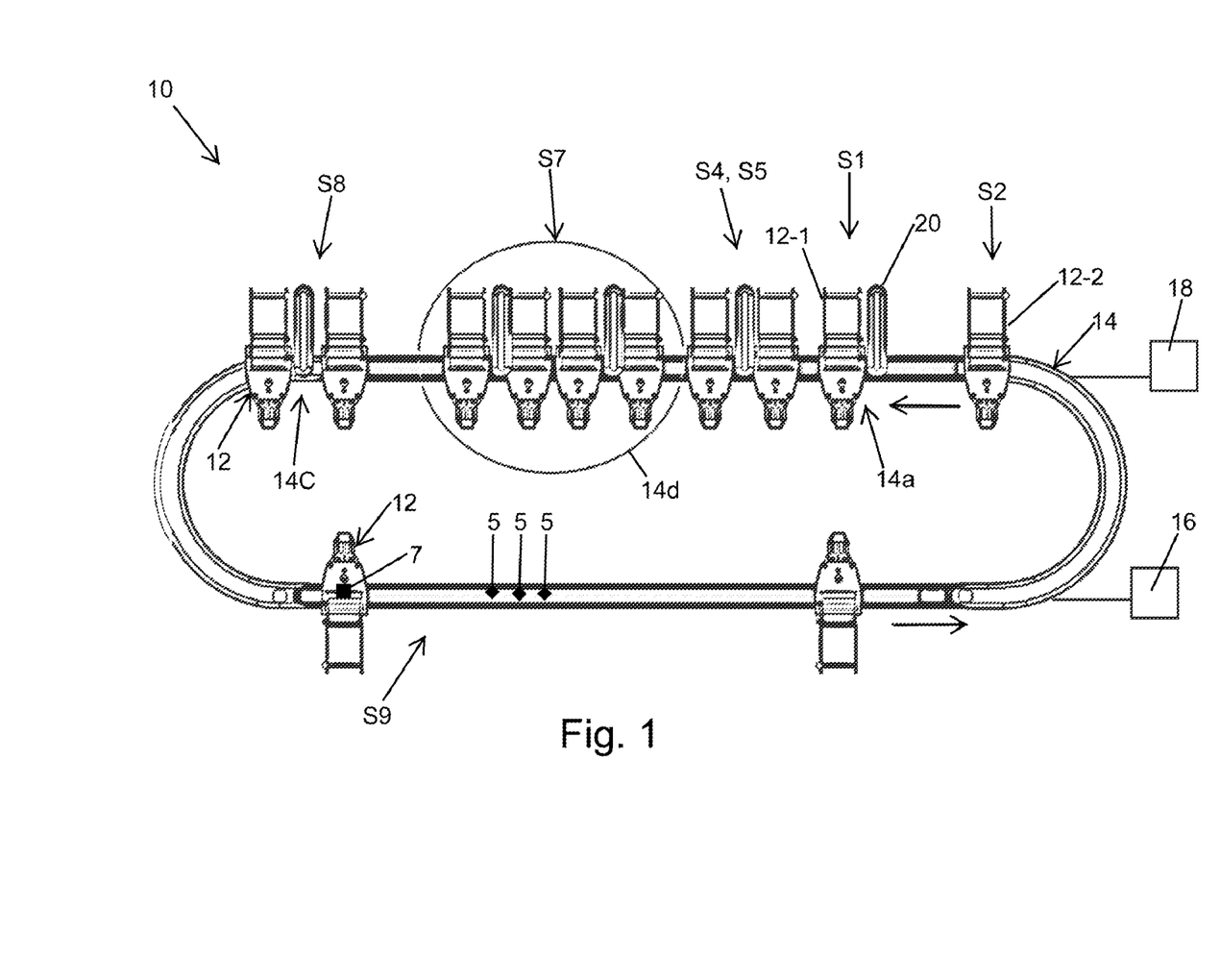
FIG. 1 is a side elevation view of one embodiment of a transport system.
Figure 2:
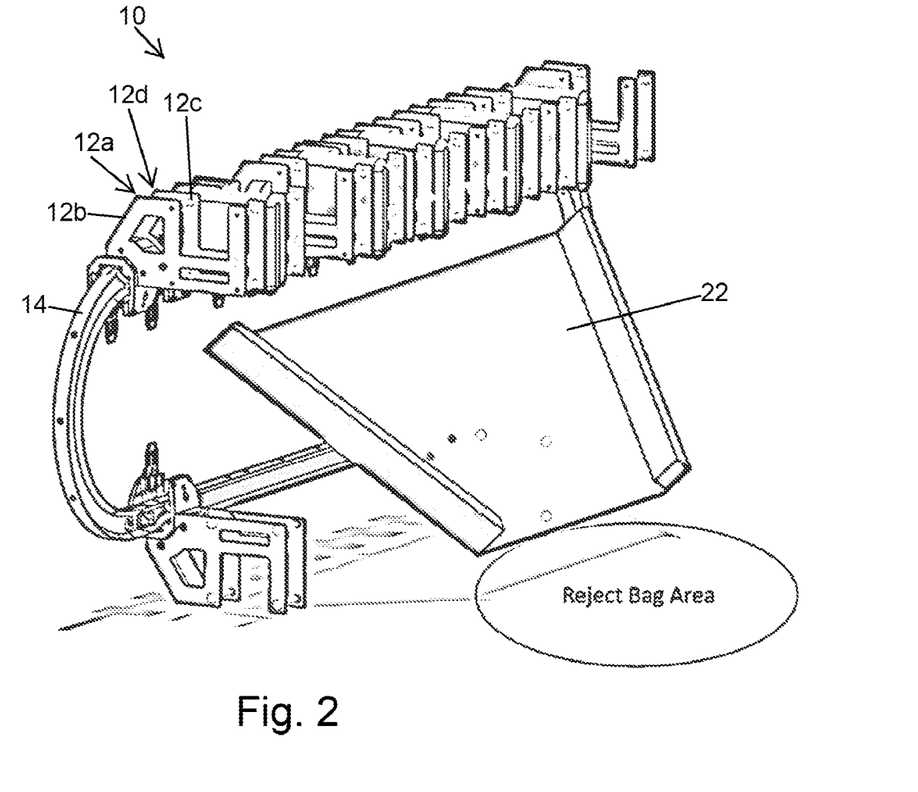
FIG. 2 is a perspective view of the transport system with a reject chute.

Referring to FIGS. 1 and 2, an exemplary transport system 10 is shown and includes multiple conveying elements or movers 12 mounted for movement about a running rail or conveyor rail 14. Here, the running rail 14 has a design with linear part regions as well as curved regions such that, in total, an oval-shaped loop section is produced. However, systems with other shapes could also be implemented. The segments of the running rail 14 incorporate linear motor modules or devices, which define a plurality of coils (e.g., 5) which are arranged in and sequentially along the running rail. Permanent magnets (e.g., 7) are typically arranged on the conveying elements 12. The conveying elements 12 can, therefore, be driven independently of each other by selective control/energization of the rail coils. In this case, an electromagnetic moving field is generated by the motor coils, and the conveying elements 12 following the moving fields by means of magnetic coupling and consequently are moved along the running rail. The system includes an associated power supply unit 16 for providing current for coil energization. A control system includes a controller 18 (e.g., processor based with associated programming) connected with the rail, the rail coils, and associated circuitry on the rail, for selective control of the energization level of individual coils, as well as components for monitoring the individual position and velocity of each of the conveying elements. One example of such a transport system is the Beckhoff XTS® linear transport system.

The system 10 enables each conveying element 12 to be programmed and commanded to travel to any location along the running rail, providing data to the controller 18 about the precise location and force required to maintain desired position/movement of the conveying element 12. Here, each conveying element 12 includes a specifically designed and engineered tooling 12a that provides the proper friction coefficient such that a flexible bag can be squeezed between two elements 12 with the tooling 12a. Here, the tooling 12a includes side parts 12b and 12c with a gap 12d therebetween, but other variations are possible. An exemplary flexible bag handling sequence can be as follows.

A single conveying element 12-1 is commanded to a programmed position along the rail, known as the load position 14a. Using a manual, robotic, or similar method, a bag 20 is placed in the load position 14a. As the bag 20 is placed, a second conveying element 12-2 (e.g., waiting at a pre-load position 14b) is commanded to travel to a position so as to locate the bag between tooling of the two elements. As conveying element 12-2 begins to squeeze the bag 20, the controller calculates, monitors, and manages the force required to position both conveying elements (e.g., such that a predetermined spacing condition between the elements is achieved, which spacing may vary according to bag size and contents). The controller 18 is configured (e.g., incorporates a programmed algorithm) to comparatively check the force required against a specified force value (e.g., in memory of the controller). The specified force value can be a set value that is static for a given run (e.g., static for a run involving the same flexible bag product) or that can vary (e.g., the specified force value varies to compensate for gradual changes in other factors such as ambient temperature or batch-dependent variables such as gas fill/purge).

The force feedback calculation provides a high level of accuracy in determining if the bag has either a proper seal, or seal deformation causing the bag to leak. If the controller 18 determines that the bag has a bad seal, the bag can be rejected by simply "opening" the conveying elements, allowing the bag to drop to a reject path, such as reject chute 22 that leads to a reject bin or a conveyance system for carrying away the rejected bags. The rejected bag can be moved along the guide rail to any position for purpose of such rejection. If the controller 18 determines that the bag has a proper seal and is within the programmed dimensions, the conveying elements will transfer the bag to a predetermined unload position 14c, where, using a manual or automated process, the bag is removed from between the conveying elements. The controller 18 may control the conveying elements to reduce the spacing between the conveying elements to facilitate bag removal.

The transport system 10 can have virtually an unlimited number of conveying elements and combinations. Therefore, the system also provides and accumulation function, with conveying element pairs working in "teams" to simultaneously check bag seal integrity and transport and accumulate bags in an accumulation zone 14d along the transport rail. This accumulation provides the ability to decouple the bag load operation from the bag unload operation, which can be a critical function in certain automation processes.

The high-level exemplary sequence of steps S is as follows.

S1—Conveying element 12-1 travels to the load position 14a.

S2—Conveying element 12-2 travels to pre-load position 14b.

S3—Bag 20 is inserted in the space or gap between elements 12-1 and 12-2.

S4—Conveying element 12-2 travels toward element 12-1, making contact with the bag 20 and providing pressure to keep the bag pressed between the two elements at some target spacing (e.g., acceptable range corresponding to known thickness of a bag with a good seal).

S5—As element 12-2 travels closer to element 12-1 to achieve the target spacing, the "squeeze" force required is calculated (e.g., by controller 18) using current feedback from the stationary motor modules along the transport rail 14.

S6a—If the force required exceeds a predetermined force value, the bag is considered to have a "good" seal. As soon as the predetermined force value is exceeded, the data is recorded/logged in the controller 18 and stored for future review and/or displayed on a user interface associated with the controller. (Move to S7).

S6b—If the force required does not exceed the predetermined force value, the elements 12-1 and 12-2 are commanded to release force (when the elements are known to be at a suitable rejection position), thus letting the bag drop out of the system into a collection bin. The conveying elements then advance without a bag and continue around the transport rail. (Skip to S9).

S7—The conveying elements 12-1 and 12-2, with associated good bag held therebetween, advance along the transport rail 14. This step may include movement into the accumulation zone 14*d*, waiting for unload, either indexing or continuously moving based on the overall load of the system. This load may be dynamically calculated and controlled by the controller 18.

S8—Once a paired team of conveying elements has advanced with a good bag to the predetermined "unload" station 14*c*, the bag is gripped by manual, robotic, or other method, and the conveying elements release force allowing the bag to be removed.

S9—The conveying elements then continue travel along the transport rail for repeating the cycle with another bag.

By way of further exemplary detail, with respect to the control system and operation of the controller 18, multiple control loops operate within the controller programming command and monitor each conveying element 12. These control loops may include a position loop, a velocity loop, and a current loop. The drive for each rail motor module/coil also has current sensing feedback that is used within the current loop. The current loop provides, and monitors thrust of the conveying element, subtracting the actual current as provided by the motor module feedback. The current for moving the conveying element will adjust to reach the setpoint for force. If the force is low, the loop calculates and adds current until the setpoint is reached. The velocity loop sends data to the current loop to increase the current when the velocity falls below the setpoint as programmed. The position loop takes the commanded position as programmed in the controller, calculates the velocity required which is then sent to the velocity loop, and the velocity loop sends the required current to the current loop thus commanding the conveying element to accelerate or decrease speed to move the conveying element to the commanded position. The current, velocity, and position loops all run simultaneously within the controller and refresh at millisecond intervals.

To provide force feedback, the command within the current loop is modified such that the current is not only monitored for positional control of the conveying element, but also for the actual current as received from the current sensor. When the following/trailing conveying element of a conveying element pair encounters oppositional force, in this case a bag, and the actual current exceeds the programed value for current, not position, the controller records the value within the data array and determines that the bag is good. If, while monitoring, the current does not exceed the programmed value, the determination is made that the bag seal is bad and the conveying elements move to reject the bag.

Thus, the system provides various advantages, such as ability to measure bag thickness while stationary or moving, ability to determine bag seal integrity, accumulation of bags, decoupling load from unload, positive position for the bag in a vertical orientation, and all in an overall size footprint is much smaller than previous systems.

In implementations, the system can incorporate a high and low threshold for the position of the conveying elements (to ensure that they are close enough together to perform the evaluation, but not so close together that they touch) and then compare movement of the elements together until the target force is reached. If the elements are too close together, the bag is under-filled as compared to the target value (but still a good seal), if the elements are too far apart, the bag is over-filled. This provides a bag fill accuracy quality metric, which can, for example, be used for things such as refining in the bag filling process (e.g., manually or automatically by feedback to a bag filler).

Figure 3:
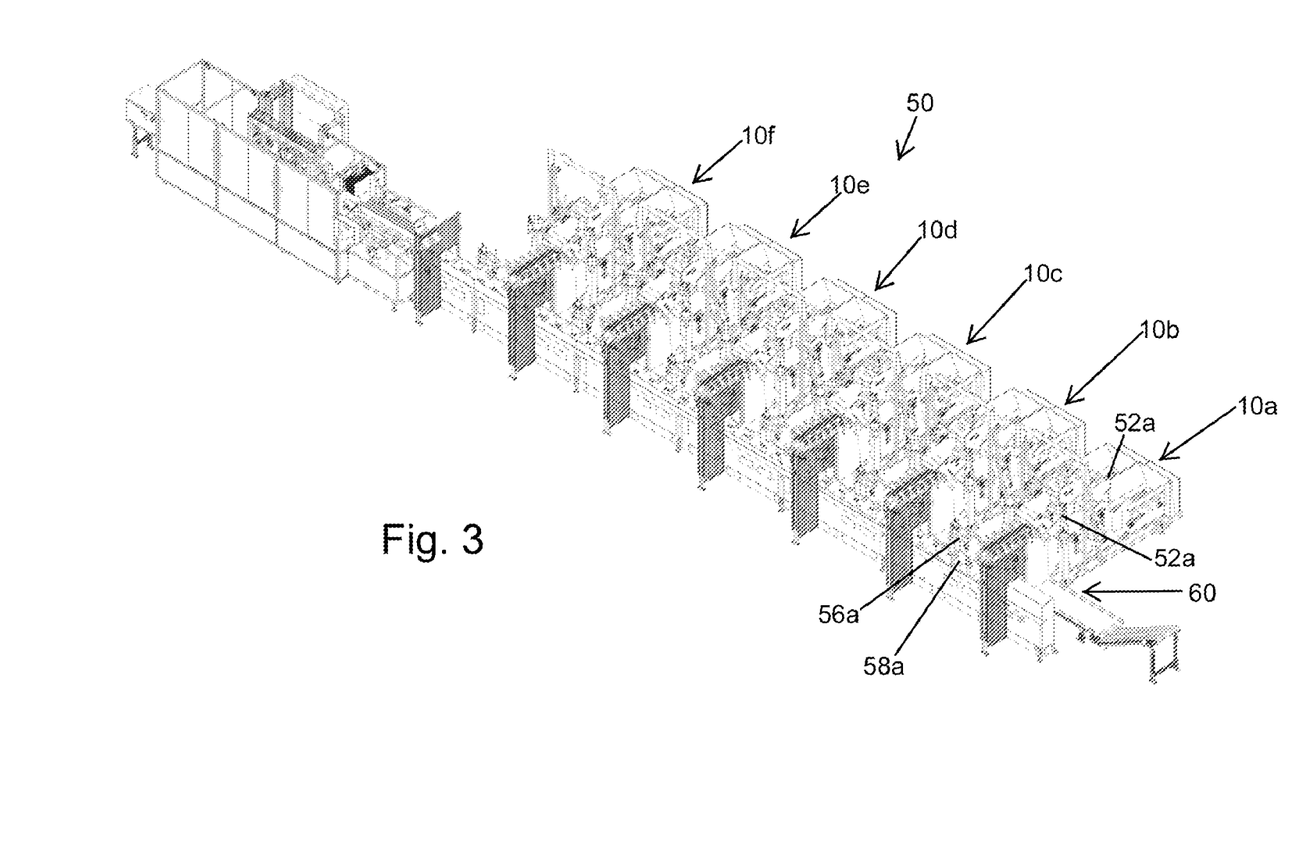
FIG. 3 is a perspective view of a packaging system incorporating multiple such transport systems.

Multiple transport systems can be employed in an overall packaging system 50, per systems 10*a*-10*f* in FIG. 3. Here, each system 10*a*-10*f* is fed bags by one or more conveyors (e.g., 52*a*) and bags are picked and loaded in the space between the conveying elements by robotic manipulation arms (e.g., 54*a*). The bags are also unloaded using robotic manipulation arms (e.g., 56*a*), for placement into packaging (e.g., 58*a*, such as boxes or bulk bags) moving along a conveyor 60 past each unload area. The system 50 enables different packaged products (e.g., different snack food bags) to be selectively packaged into a combination pack style package.

It is to be clearly understood that the above description is intended by way of illustration and example only, is not intended to be taken by way of limitation, and that other changes and modifications are possible.

For example, the use of a continuous loop is not required. In particular, a linear only rail section could be used in a manifestation of a standalone implementation of the flexible bag seal-check device, which could be attached directly to a machine that forms, fills, and seals, the bag. Such a system would perform a bag-check inline. In this system, the conveying elements or movers would squeeze on an inserted bag, perform the seal check (and thickness evaluation), release the bag for removal or drop out, then open up to accept the next bag, and repeat.

Figure 4:
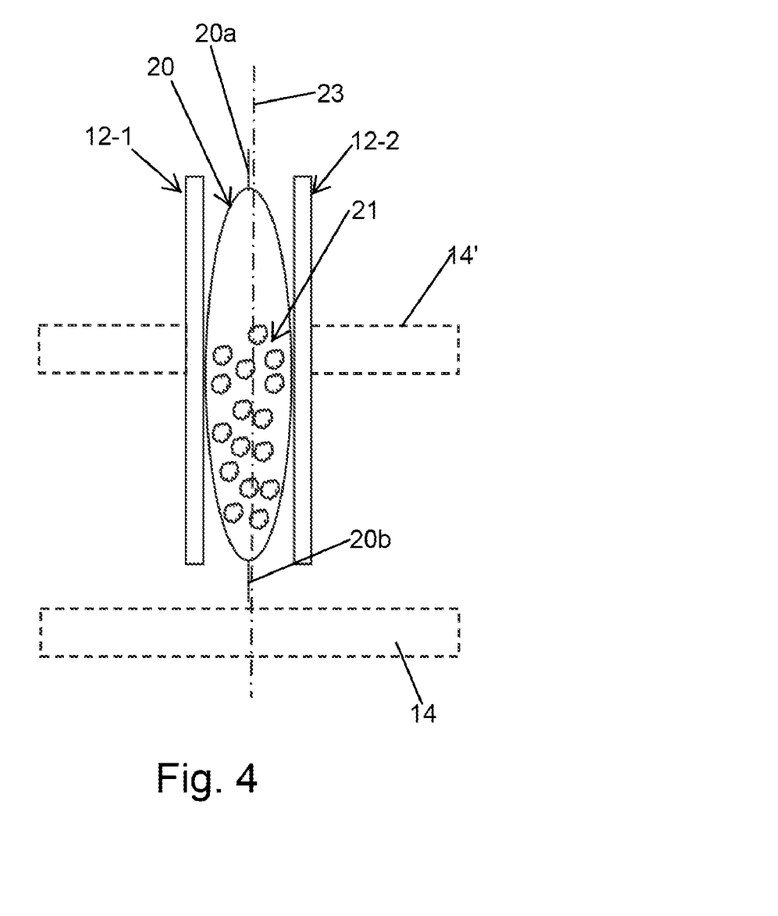
FIG. 4 is a schematic depiction of a flexible bag during squeeze.

In other variations, the loop or rail could be oriented differently (e.g., the view of FIG. 1 could represent a top plan view). Referring to FIG. 4, an exemplary orientation of a flexible bag 20, with sealed edges 20*a* and 20*b* and product 21 therein, is shown during a squeezing operation between the conveying elements 12-1 and 12-2 (shown only in part). FIG. 4 represents a side elevation view during the squeeze. In the case of a system oriented such that the FIG. 1 depiction is a side elevation view, the running rail would be located as per 14 (e.g., below the squeezing parts in the side elevation view). In the case of a system oriented such that the FIG. 1 depiction is a top plan view, the running rail would be located as per 14' (e.g., rearward of the squeezing parts in the side elevation view). In either case, a main plane 23 of the bag 20 is oriented substantially upright (e.g., offset from horizontal by at least seventy-five degrees during the squeeze test).

Figure 5:
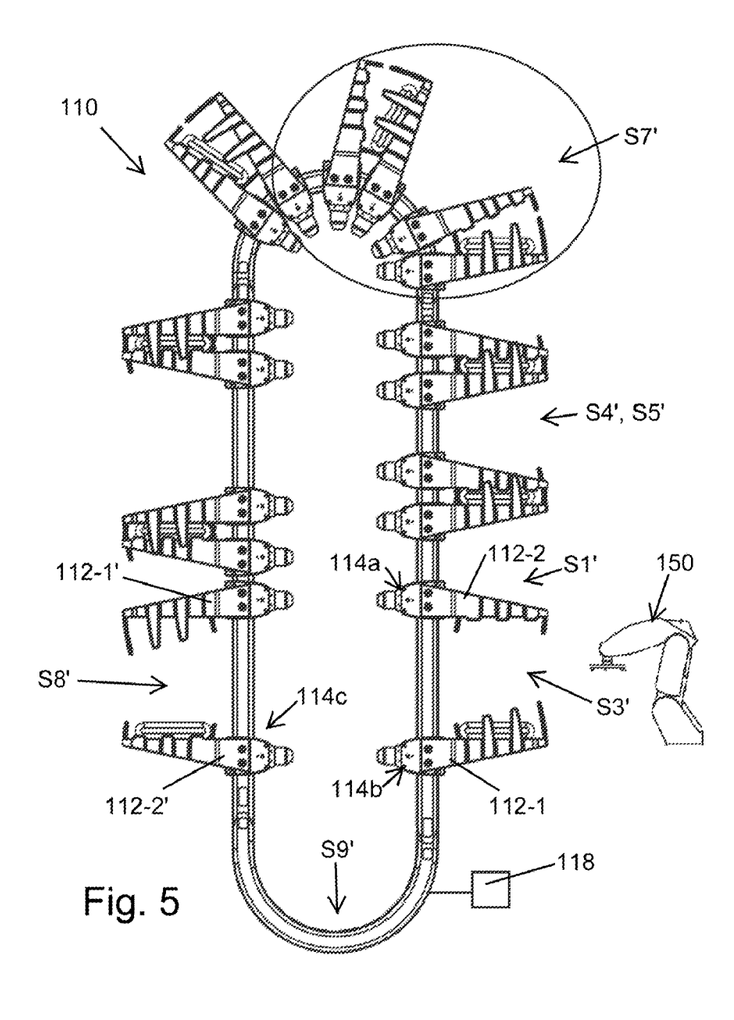
FIGS. 5 and 6 show front elevation and perspective views of another embodiment of a transport system.
Figure 6:
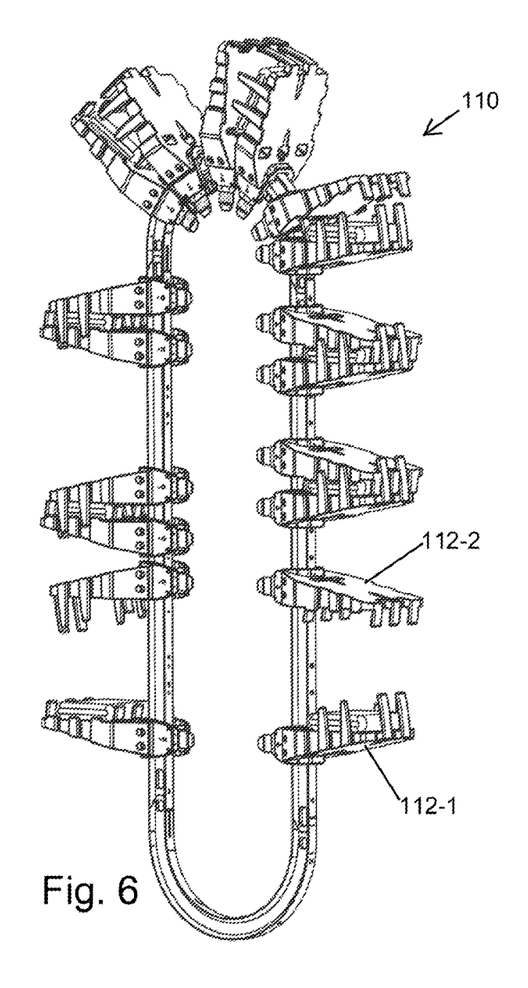
Figure 7:
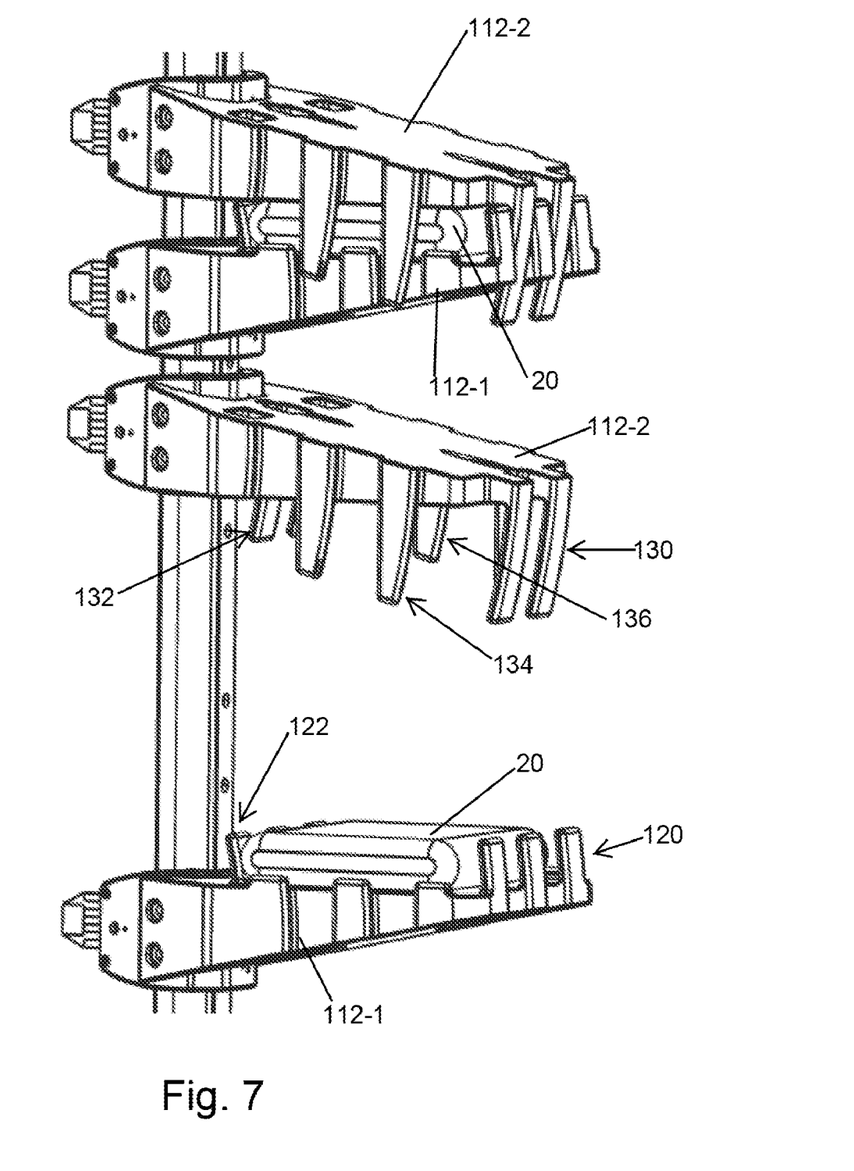
FIG. 7 shows a perspective view of part of the system of FIG. 6.

FIGS. 5-7 depict an embodiment of a system 110 in which the long straight sections of the rail 114 run vertically. In this embodiment, the handling and evaluation process is as indicated by the following exemplary steps.

S1'— Conveying element 112-2 travels to the load position 114a.

S2'— Conveying element 112-1 travels to its load position 114b, which trails the load position 114a, relative to the movement direction. The gap between the two conveying elements is a bag receiving space.

S3'— Bag 20 is inserted in the space or gap between elements 112-1 and 112-2 (e.g., using a pick-and-place robotic arm 150). Here, the bag 20 lies flat on an upwardly facing surface portion of the conveying element 112-1. This orientation allows product within the bag to spread across a large surface area of the bag, which improves seal evaluation by reducing the likelihood that the conveying elements will squeeze product.

S4'— Conveying element 112-1 travels toward element 112-2, making contact with the bag 20 and providing pressure to keep the bag pressed between the two elements at some target spacing (e.g., acceptable range corresponding to known thickness of a bag with a good seal).

S5'— As element 112-1 travels closer to element 112-2 to achieve the target spacing, the "squeeze" force required is calculated (e.g., by controller 118) using current feedback from the stationary motor modules along the transport rail 14.

S6a'—If the force required exceeds a predetermined force value, the bag is considered to have a "good" seal. As soon as the predetermined force value is exceeded, the data is recorded/logged in the controller 118 and stored for future review and/or displayed on a user interface associated with the controller. (Move to S7').

S6b'—If the force required does not exceed the predetermined force value, the elements 112-1 and 112-2 are commanded to release force (when the elements are known to be at a suitable rejection position, which may not be until the bottom loop portion of the rail), thus letting the bag drop out of the system into a collection bin. The conveying elements then advance without a bag and continue around the transport rail. (Skip to S9).

S7'— The conveying elements 112-1 and 112-2, with associated good bag held therebetween, advance along the transport rail 114. This step may include movement into the accumulation zone 114d, waiting for unload, either indexing or continuously moving based on the overall load of the system. This load may be dynamically calculated and controlled by the controller 118.

S8'— Once a paired team of conveying elements has advanced with a good bag to the predetermined "unload" station 114c, the bag is gripped by manual, robotic, or other method, and the conveying elements release force allowing the bag to be removed.

S9'— The conveying elements then continue travel along the transport rail for repeating the cycle with another bag.

Notably, in the embodiment depicted in system 110, the bag 20 is loaded onto one conveying element 112-1 (the trailing conveying element of the pair) and is unloaded from the other conveying element 112-2 (the leading conveying element of the pair).

As best seen in FIG. 7, the conveying elements 112-1 and 112-2 are configured to define a space to capture and retain the bag 20. In particular, conveying element 112-1 includes forward projecting (relative to the movement direction) outer fingers 120 and inner fingers 122, and the conveying element 112-2 includes rearward projecting (relative to the movement direction) outer fingers 130, inner fingers 132 and side fingers 134 and 136. When the bag 20 is captured between the two conveying elements 120-1 and 120-2, the collective fingers provide a guard structure that surrounds the perimeter of the bag 20 to prevent the bag from moving out of the capture space between the two conveying elements. This is particularly important when the conveying elements are moving at speed, for example, around the upper loop portion of the rail 114, which could tend to throw the bag outwardly away from the rail 114 as the distal ends of the conveying elements tend to separate somewhat.

As mentioned above, bag seal integrity could be checked while one of the conveying elements is stationary, or while both conveying elements are moving.

In one embodiment, in which bag seal integrity is checked while one of the conveying elements (generally the leading conveying element) is stationary, the following conveying element is moved toward the leading conveying element at a controlled, set speed and the force required to move the following conveying element is monitored. When that force, which is representative of the squeeze force, reaches a threshold level, the spacing between the two conveying elements is checked and, if that spacing is within a set range, the bag is determined to have a satisfactory seal.

In another embodiment, in which bag seal integrity is checked while one of the conveying elements (generally the leading conveying element) is stationary, the following conveying element is moved toward the leading conveying element with a controlled, set force and the speed or movement of the following conveying element is monitored. When that following conveying element stops moving, the spacing between the two conveying elements is checked and, if that spacing is within a set range, the bag is determined to have a satisfactory seal. In this embodiment, the controlled, set force used to move the following conveying element is representative of the squeeze force on the bag at the time the following conveying element stops moving.

Still other variations are possible.

What is claimed is:

1. A system for transporting and evaluating flexible bags filled with product, the system comprising:
    a running rail;
    a plurality of conveying elements mounted for movement along the running rail;
    a control system configured such that each conveying element is independently movable along running rail, wherein the control system is further configured such that a first conveying element of the plurality of conveying elements and a second conveying element of the plurality of conveying elements are positioned to form a bag receiving space therebetween and into which a flexible bag can be loaded, wherein the control system is further configured to control movement of at least one of the first conveying element and the second conveying element such that the flexible bag is squeezed between the first conveying element and the second conveying element, wherein the control system is further configured to evaluate a squeeze force on the flexible bag between the first conveying element and the second conveying element and/or a dimensional spacing between the first conveying element and the second conveying element in order to identify the flexible bag as having a satisfactory seal or an unsatisfactory seal.

2. The system of claim 1, wherein the flexible bag is oriented with its main plane either (i) substantially upright in the bag receiving space during evaluation or (ii) substantially horizontal in the bag receiving space.

3. The system of claim 1, wherein the controller is configured to evaluate the squeeze force during movement of the first conveying element and the second conveying element for transport of the flexible bag.

4. The system of claim 1, wherein the control system is configured to determine if the squeeze force meets or exceeds a threshold squeeze force while the first conveying element and the second conveying element satisfy a predefined dimensional spacing condition.

5. The system of claim 4, wherein the control system is configured such that, if the squeeze force meets or exceeds the threshold squeeze force while the first conveying element and the second conveying element satisfy the predefined dimensional spacing condition, the control system identifies the flexible bag as having a satisfactory seal.

6. The system of claim 5, wherein the control system is configured such that, if the control system identifies the flexible bag as having a satisfactory seal, the control system effects movement of the first conveying element and the second conveying element to position the flexible bag at an unload area of the running rail.

7. The system of claim 6, wherein the control system is configured to effect movement of the first conveying element and the second conveying element to position the flexible bag at an accumulation region of the running rail prior to positioning of the flexible bag at the unload area.

8. The system of claim 4, wherein the control system is configured such that, if the squeeze force does not meet exceed the threshold squeeze force while the first conveying element and the second conveying element satisfy the predefined dimensional spacing condition, the control system identifies the flexible bag a having an unsatisfactory seal.

9. The system of claim 8, wherein the control system is configured such that, if the control system identifies the flexible bag as having an unsatisfactory seal, the control system effects movement of the first conveying element and the second conveying element such that the flexible bag is dropped out of the bag receiving space in a reject operation.

10. The system of claim 1, wherein the running rail is formed as a continuous rail loop.

11. The system of claim 1, wherein the first conveying element and the second conveying element are collectively configured with multiple projecting fingers that provide a guard structure that surrounds a perimeter of the flexible bag, as the flexible bag is being conveyed, to prevent the flexible bag from moving out of the bag receiving space between the first conveying element and the second conveying element.

12. A method for handling and evaluating a flexible bag filled with product utilizing a system having a running rail and first and second conveying elements mounted for controllable independent movement along the running rail, the method comprising:

positioning the first conveying element and the second conveying element at a spaced apart locations at which a bag receiving space is formed therebetween;

loading a flexible bag into the bag receiving space; and controlling movement of at least one of the first conveying element and the second conveying element such that the flexible bag is squeezed between the first conveying element and the second conveying element in order to evaluate seal integrity of the flexible bag.

13. The method of claim 12, wherein a squeeze force on the flexible bag is evaluated in order to evaluate seal integrity.

14. The method of claim 13, wherein the squeeze force is evaluated, at least in part, while the first conveying element and the second conveying element are substantially stationary.

15. The method of claim 13, wherein the squeeze force is evaluated, at least in part, while the first conveying element and the second conveying element are simultaneously moving to transport the flexible bag.

16. The method of claim 13, wherein a spacing condition between the first conveying element and the second conveying element is also evaluated, along with the squeeze force, to evaluate seal integrity.

17. The method of claim 16, wherein evaluation of the spacing condition involves determining whether a distance between the first and second conveying elements is within a set range.

18. The method of claim 13, wherein at least one motor current is evaluated as an indicator of the squeeze force.

19. The method of claim 13, further comprising evaluating a spacing achieved between the first conveying element and the second conveying element in order to evaluate a fill level of the flexible bag.

20. A method of handling a flexible bag containing product therein, the method comprising:

utilizing a running rail having first and second conveying elements mounted for independent movement along the running rail;

positioning the first and second conveying elements to form a receiving space for the flexible bag;

controlling movement of the first and second conveying elements so as to squeeze the flexible bag between the first and second conveying elements; and evaluating a squeeze force on the flexible bag by the first and second conveying elements and/or a dimensional spacing between the first and second conveying elements in order to identify the flexible bag as acceptable or not acceptable.

\* \* \* \* \*